United States Patent
Matsui (10) Patent No.: US 9,479,675 B2
(45) Date of Patent: Oct. 25, 2016

(54) IMAGE READING DEVICE AND IMAGE FORMING APPARATUS

(71) Applicant: KYOCERA Document Solutions Inc., Osaka (JP)

(72) Inventor: Shinya Matsui, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/661,776

(22) Filed: Mar. 18, 2015

(65) Prior Publication Data
US 2015/0281516 A1    Oct. 1, 2015

(30) Foreign Application Priority Data
Mar. 25, 2014  (JP) ................. 2014-061657

(51) Int. Cl.
| | |
|---|---|
| G06K 7/10 | (2006.01) |
| H04N 1/40 | (2006.01) |
| H04N 1/04 | (2006.01) |
| H04N 1/48 | (2006.01) |

(52) U.S. Cl.
CPC .............. H04N 1/40 (2013.01); H04N 1/04 (2013.01); H04N 1/486 (2013.01)

(58) Field of Classification Search
CPC .......... H04N 1/40; H04N 1/04; H04N 1/486; H04N 1/46; H04N 1/52; H04N 1/58; H04N 1/6027; H04N 5/23245; H04N 9/735; H04N 19/13; H04N 19/134; H04N 19/14; H04N 19/18; H04N 19/44; H04N 19/60; H04N 19/61; H04N 19/91; H04N 19/93
See application file for complete search history.

(56) References Cited

U.S. PATENT DOCUMENTS

| | | | |
|---|---|---|---|
| 8,488,219 B2 | 7/2013 | Mikami | 358/475 |
| 8,786,920 B2 | 7/2014 | Mikami | 358/509 |
| 2004/0165234 A1 | 8/2004 | Hashizume | 358/505 |
| 2010/0128331 A1* | 5/2010 | Hamano | H04N 1/00795 358/505 |
| 2011/0058237 A1 | 3/2011 | Mikami | 358/509 |
| 2011/0205598 A1* | 8/2011 | Kato | H04N 1/40056 358/448 |
| 2013/0278979 A1 | 10/2013 | Mikami | 358/509 |

FOREIGN PATENT DOCUMENTS

JP    2011-61433 A    3/2011

* cited by examiner

*Primary Examiner* — Thien T Mai
(74) *Attorney, Agent, or Firm* — Stein IP, LLC (57) ABSTRACT

An image reading device, at a starting time point, starts one mode gain setting processing, which is processing of obtaining a gain set value of a shared amplifier in one of a color mode and a monochrome mode. After the one mode gain setting processing is completed, the image reading device performs an other mode gain setting processing, which is processing of obtaining a gain set value of the shared amplifier in the other mode. In a case where an instruction to perform a reading job in the one mode is received while the other mode gain setting processing is being performed, the image reading device discontinues the other mode gain setting processing and performs the reading job in the one mode.

7 Claims, 7 Drawing Sheets

IMAGE READING DEVICE AND IMAGE FORMING APPARATUS

INCORPORATION BY REFERENCE

This application is based upon and claims the benefit of priority from the corresponding Japanese Patent Application No. 2014-061657 filed on Mar. 25, 2014, the entire contents of which are incorporated herein by reference.

BACKGROUND

The present disclosure relates to an image reading device and an image forming apparatus.

Image forming apparatuses such as copiers and multi-functional peripherals (hereafter referred to as MFPs) are equipped with an image reading device which reads a document and generates image data. The image reading device is provided with a light source, an image sensor, an amplifier, an A/D converter, etc., for example.

The light source generates light with which a target document is to be irradiated. The image sensor receives document-reflected light, which has been reflected from the document, and outputs analog signals according to the amount of the document-reflected light received. The amplifier performs amplification processing on the analog signals received from the image sensor. The A/D converter performs A/D conversion processing on the analog signals amplified by the amplifier.

In such an image reading device, a gain set value of the amplifier is obtained (hereafter referred to as "gain setting processing") at a time of turning on a main power supply or when returning from a sleep mode. In the gain setting processing, the amplification processing and the A/D conversion processing are performed on analog signals generated by the image sensor in reading a white reference board that is used for shading correction. Then, based on the image data (after the A/D conversion) obtained through reading the white reference board, the gain set value of the amplifier is obtained. Then, in a reading job, the gain of the amplifier is adjusted to the value obtained through the gain setting processing.

Here, conventionally, there have been known image reading devices equipped with two reading mode, that is, a color mode in which color image data is generated and a monochrome mode in which monochrome image data is generated. In such image reading devices, used as the image sensor is a four-line image sensor which includes three line sensors for the color mode (hereafter referred to as "color sensors") respectively corresponding to R, G, and B, and a line sensor for the monochrome mode (hereafter referred to as "monochrome sensor").

Also, there are some cases where a common image data path is used in both the color mode and the monochrome mode. In such a case, the three color sensors each have an amplifier and an A/D converter connected thereto. That is, the analog signals from the three color sensors are outputted to different image data paths to undergo the amplification processing and the A/D conversion processing. Analog signals from the monochrome sensor are outputted to one of or a plurality of image data paths for the color mode. Thus, one or a plurality of the amplifiers (the A/D converters) used for the color mode are used in the monochrome mode as well.

SUMMARY

According to a first aspect of the present disclosure, an image reading device is an image reading device that is equipped with a color mode in which color image data is generated and a monochrome mode in which monochrome image data is generated, and the image reading device includes a light source, an image sensor, a plurality of amplifiers, a plurality of gain adjustment circuits, a plurality of A/D converters, a reading control portion, and a reception portion. The light source is configured to irradiate a reading target with light. The image sensor includes a plurality of line sensors. The plurality of amplifiers are configured to amplify analog signals outputted from the image sensor. The plurality of gain adjustment circuits are provided corresponding to the plurality of amplifiers on a one-to-one basis, each being configured to perform gain adjustment of a corresponding one of the amplifiers. The plurality of A/D converters are provided corresponding to the plurality of amplifiers on the one-to-one basis, each being configured to convert an analog signal amplified by a corresponding one of the amplifiers into digital image data. The reading control portion causes gain adjustment of each of the plurality of amplifiers to be performed by a corresponding one of the gain adjustment circuits. The reception portion receives both an instruction to perform a reading job and a selection of one of the color mode and the monochrome mode as a mode in performing the reading job. At least one of the plurality of amplifiers is a shared amplifier which is used in both the color mode and the monochrome mode. And, at a starting time point previously determined as a time point to start gain setting processing for obtaining gain set values of the amplifiers, the reading control portion starts one-mode gain setting processing for obtaining a gain set value of the shared amplifier in one mode of the color mode and the monochrome mode, and after the one-mode gain setting processing is completed, the reading control portion performs other-mode gain setting processing for obtaining a gain set value of the shared amplifier in an other mode of the color mode and the monochrome mode, and in a case where the reception portion receives an instruction to perform a reading job in the one mode while the other-mode gain setting processing is being performed, the reading control portion discontinues the other-mode gain setting processing, and performs the reading job in the one mode.

According to a second aspect of the present disclosure, an image forming apparatus includes the image reading device described above.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Hereinafter, descriptions will be given of an image reading device (an image forming apparatus) according to an embodiment of the present disclosure, dealing with an MFP (Multi-Function Peripheral) equipped with functions as a scanner, a copier, a printer, etc. as an example.

(Overall Configuration of MFP)

Figure 1:
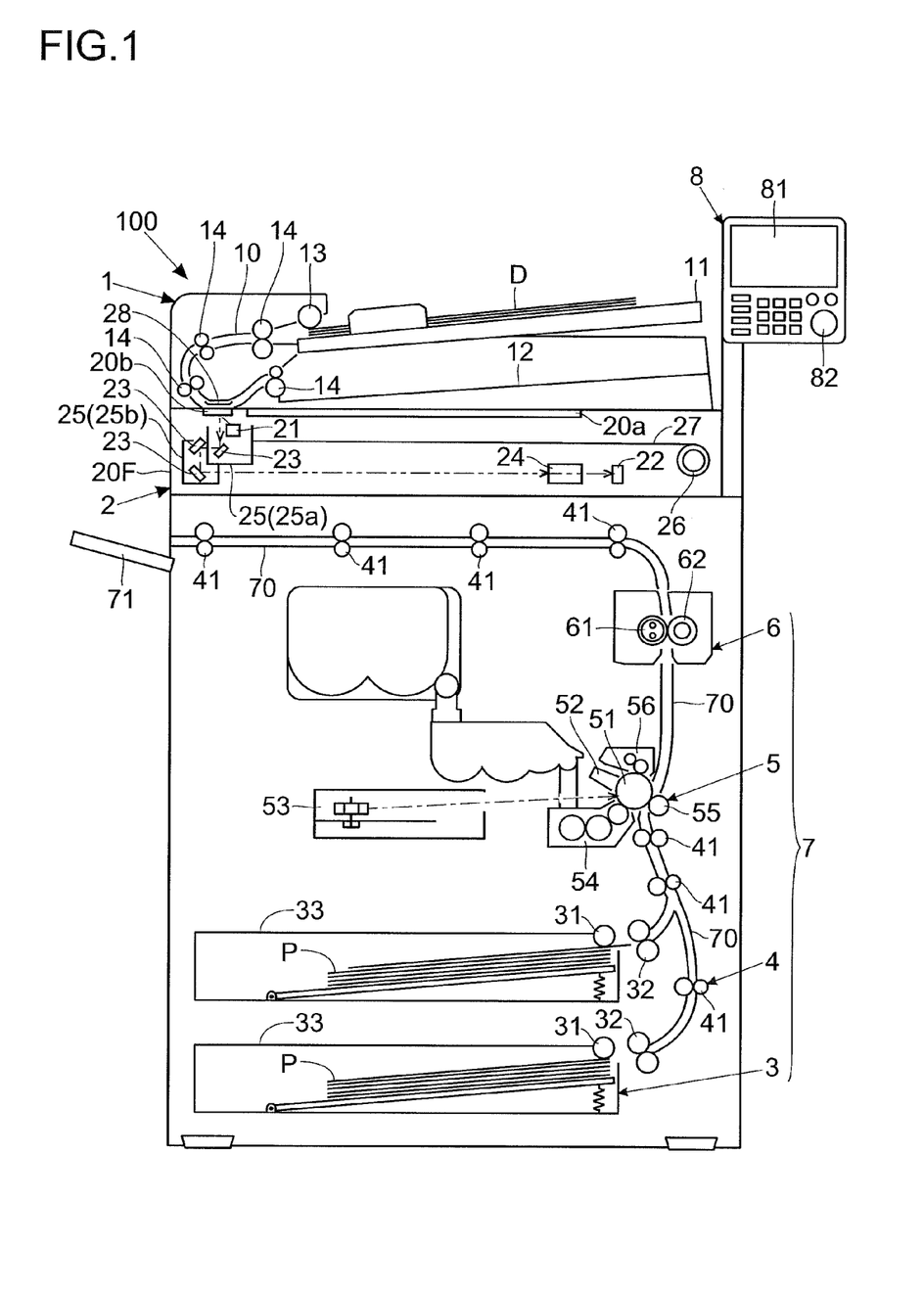
FIG. 1 is a schematic diagram of an MFP according to an embodiment of the present disclosure.

As shown in a FIG. 1, an MFP 100 includes an image reading portion 2 to which a document conveying unit 1 is attached. The image reading portion 2 reads a document D as a target of reading, and generates image data of the document D. Note that, although the MFP 100 is a monochrome machine, it is equipped with, as reading modes, a color mode in which color image data is generated and a monochrome mode in which monochrome image data is generated.

The MFP 100 further includes a printing portion 7 constituted by a sheet feeding portion 3, a sheet conveying portion 4, an image forming portion 5, and a fixing portion 6. The printing portion 7 conveys a sheet P along a sheet conveying path 70 and forms a toner image on the sheet P based on image data. Image data is obtained through reading of the document D performed by the image reading portion 2 in some cases, and in some cases, image data is transmitted from a later-described computer 300 (see FIG. 2). Then, the printing portion 7 transfers the toner image onto the sheet P under conveyance, and after fixing the toner image, discharges the printed sheet P, on which the toner image has been transferred and fixed, onto an ejection tray 71.

The sheet feeding portion 3 includes pickup rollers 31 and sheet feeding roller pairs 32, and feeds the sheet P stored in sheet cassettes 33 into the sheet conveying path 70. The sheet conveying portion 4 includes a plurality of conveying roller pairs 41, and conveys the sheet P along the sheet conveying path 70.

The image forming portion 5 includes a photosensitive drum 51, a charging device 52, an exposing device 53, a developing device 54, a transfer roller 55, and a cleaning device 56. The image forming portion 5 forms a toner image based on image data, and transfers the toner image onto the sheet P. The fixing portion 6 includes a heating roller 61 and a pressure roller 62, and fixes the toner image that has been transferred on to the sheet P by applying heat and pressure thereto.

The MFP 100 further includes an operation panel 8. The operation panel 8 includes a liquid crystal display panel 81 provided with a touch panel. The liquid crystal display panel 81 displays soft keys via which to receive inputs of various settings, messages, etc. The operation panel 8 is further provided with hard keys such as a start key 82. The operation panel 8 receives instructions to perform jobs accompanied by reading a document D (hereafter referred to as "reading job") such as a scanning job and a copying job, and also receives a selection of one of the color mode and the monochrome mode as the mode in performing the reading job. That is, the operation panel 8 is equivalent to the "reception portion".

(Configuration of Image Reading Portion)

The image reading portion 2 has a reading frame 20F on which the document conveying unit 1 is supported in an openable/closable manner. The reading frame 20F has contact glasses 20a and 20b fitted therein. The image reading portion 2 performs stationary reading and feed reading. In the stationary reading, a document D placed over the contact glass 20a is read. In the feed reading, a document D is conveyed by the document conveying unit 1 and read while passing over the contact glass 20b.

The document conveying unit 1 of the image reading portion 2 is provided with a document conveying path 10 that passes over the contact glass 20b. At an upstream-side end of the document conveying path 10 in a conveyance direction, a document set tray 11 is disposed in which the document D is set before it is read. At a downstream-side end of the document conveying path 10 in the conveyance direction, an ejection tray 12 is disposed onto which the document D is ejected after it is read. A feed roller 13 is disposed on the upstream side of the document conveying path 10. A plurality of conveying roller pairs 14 are disposed in the document conveying path 10 from the upstream side to the downstream side thereof.

At a time of feed reading, the document D set in the document set tray 11 is fed into the document conveying path 10 by the feed roller 13. Thereafter, the document D fed into the document conveying path 10 is conveyed along the document conveying path 10 by the conveying roller pairs 14. Thereby, the document D passes over the contact glass 20b.

The image reading portion 2 includes a light source 21, an image sensor 22, mirrors 23, a lens 24, etc. These members are arranged inside the reading frame 20F.

The light source 21 includes a plurality of LED elements, and generates light with which to irradiate the document D. The plurality of LED elements are linearly aligned in a main scanning direction (a direction perpendicular to a surface of a sheet of FIG. 1), which is a reading line direction. Here, a cold cathode tube or the like may be used as the light source 21. At a time of stationary reading, the light source 21 emits light toward the contact glass 20a (and the document D is irradiated with the light that has passed through the contact glass 20a). On the other hand, at the time of feed reading, the light source 21 emits light toward the contact glass 20b (and the document D is irradiated with the light that has passed through the contact glass 20b). The light reflected by the document D is then reflected by the mirrors 23 and directed into the lens 24. The lens 24 condenses reflected light.

The image sensor 22 reads the document D line by line by receiving reflected light from the document D (light condensed through the lens 24). Specifically, on receiving the reflected light, the image sensor 22 performs photoelectric conversion on the reflected light and stores charges line by line and with respect to each pixel, and outputs analog signals corresponding to the stored charges. That is, the analog signal from each pixel of the image sensor 22 changes according to the amount of reflected light.

Inside the reading frame 20F, a movable frame 25 is provided to be movable in a sub-scanning direction which intersects with a main scanning direction at right angles. The movable frame 25 is connected to a wire 27 which is wound around a wind-up drum 26. It is by rotation of the wind-up drum 26 that the movable frame 25 is caused to move in the sub-scanning direction. Note that, although FIG. 1 illustrates as if there is only one wire 27, but there are actually two wires 27 provided on near and far sides as seen from the front face of the apparatus.

The movable frame 25 includes a first movable frame 25a and a second movable frame 25b which are movable independently of each other. The first movable frame 25a has the light source 21 and one of the mirrors 23 attached thereto, and the second movable frame 25b has the other mirrors 23 attached thereto. With this arrangement, when the movable frame 25 moves in the sub-scanning direction, the light source 21 and the mirrors 23 are caused to move in the sub-scanning direction together with the movable frame 25.

At the time of stationary reading, the movable frame 25 moves in the sub-scanning direction (a direction from left to right as seen from the front). Then, while the movable 25 is moving in the sub-scanning direction, the document D placed on the contact glass 20a is irradiated with light from the light source 21, and the image sensor 22 continuously and repeatedly performs photoelectric conversion on the reflected light from the document D. Thereby, reading of the document D is performed line by line. Here, in order to keep an optical path length from the light source 21 to the image sensor 22 constant even when the movable frame 25 is moved in the sub-scanning direction, the first movable frame 25a is set to move twice as fast as the second movable frame 25b.

On the other hand, at the time of feed reading, the movable frame 25 moves to under the contact glass 20b and stops there. Thereafter, the document conveying unit 1 conveys the document D along the document conveying path 10. At this time, the document D is irradiated with light from the light source 21 while passing over the contact glass 20b, and the image sensor 22 continuously and repeatedly performs photoelectric conversion on reflected light reflected from the document D. Thereby, reading of the document D is performed line by line.

The image reading device 2 is provided with the white reference board 28 use in the shading correction. The white reference board 28 is disposed in the document conveying unit 1 such that it faces the contact glass 20b when the document conveying unit 1 is closed. Thus, in a state where the document conveying unit 1 is closed, when the light source 21 is caused to illuminate under the contact glass 20b with no document D conveyed thereto, light from the light source 21 is reflected by the white reference board 28, and the image sensor 22 receives the reflected light. Thereby, reading of the white reference board 28 can be performed. In this case, the white reference board 28 is the target of reading.

(Hardware Configuration of Overall Apparatus)

Figure 2:
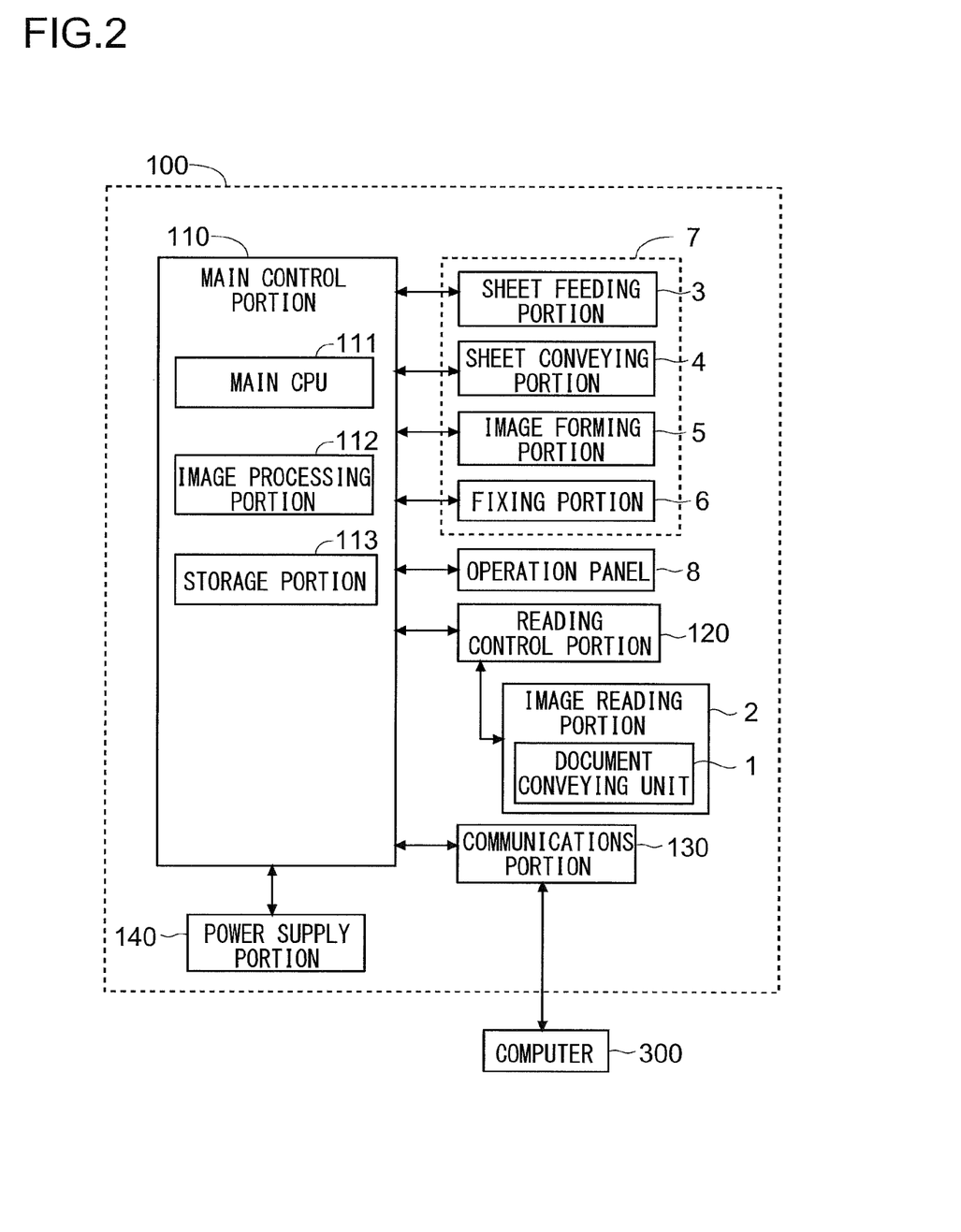
FIG. 2 is a block diagram for illustrating an overall hardware configuration of the MFP shown in FIG. 1.

As shown in FIG. 2, the MFP 100 includes a main control portion 110.

The main control portion 110 includes a main CPU 111, an image processing portion 112, and a storage portion 113. The image processing portion 112 is constituted by, for example, an ASIC dedicated for image processing, and performs image processing (expansion/reduction, density conversion, data format conversion, etc.) on image data. The storage portion 113 is constituted by a ROM, a RAM, etc., and stores programs and data. The main control portion 110 controls an operation of each portion of the apparatus based on the programs and the data stored in the storage portion 113.

Specifically, the main control portion 110 is connected to a reading control portion 120. The main control portion 110 instructs the reading control portion 120 to control a reading operation of the image reading portion 2 and a conveying operation of the document conveying unit 1. Further descriptions will be given in detail later.

The main control portion 110 is connected also to the printing portion 7 (the sheet feeding portion 3, the sheet conveying portion 4, the image forming portion 5, and fixing portion 6), and the main control portion 110 controls a printing operation of the printing portion 7.

The main control portion 110 is connected also to the operation panel 8, and controls a display operation of the operation panel 8, or detects an operation performed with respect to the operation panel 8. For example, if the main control portion 110 detects a pressing-down operation performed on the start key 82 in a state where a document D is set in the document conveying unit 1, the main control portion 110 determines that an instruction to perform a reading job has been received. The main control portion 110 also causes the liquid crystal display panel 81 to display a screen (not shown) for receiving selection of reading mode in which to perform the reading job. The main control portion 110 then detects a touch operation on the liquid crystal display panel 81, and determines which of the color mode and the monochrome mode has been selected.

The main control portion 110 is connected also to a communications portion 130. The communications portion 130 is communicatably connected to an external computer 300 (a user terminal, a server, etc.). When the communications portion 130 receives image data from the computer 300, the main control portion 110 causes the printing portion 7 to perform printing of an image based on the image data. Or, the main control portion 110 instructs the communications portion 130 to transmit image data obtained through reading of a document D performed by the image reading portion 2 to the computer 300.

The main control portion 110 is connected also to a power supply portion 140. The power supply portion 140 receives instructions from the main control portion 110, generates voltage required to operate each portion of the apparatus, and supplies power to each portion of the apparatus.

Here, the MFP 100 is equipped with a normal power mode and a sleep mode (power-saving mode) as power supply modes. The normal power mode is a mode in which normal power supply is provided to each portion of the apparatus. The sleep mode is a mode in which power supply provided to each portion of the apparatus is smaller than in the normal power mode.

When a mode-shifting condition required for shifting from the normal power mode to the sleep mode is satisfied, the main control portion 110 instructs the power supply portion 140 to shift from the normal power mode to the sleep mode. Specifically, for example, the main control portion 110 counts an unused time, which is a period of time that passes without the MFP 100 being used, and when the counted unused time exceeds a previously determined threshold time, the main control portion 110 determines that the mode-shifting condition is satisfied, and shifts the power supply mode from the normal power mode to the sleep mode. Or, when the operation panel 8 has received an operation for shifting from the normal power mode to the sleep mode, too, the main control portion 110 determines that the mode-shifting condition for shifting from the normal power mode to the sleep mode is satisfied, and shifts the power supply mode from the normal power mode to the sleep mode.

In the sleep mode, when the power supply portion 140 receives, from a returning condition detecting portion, a return signal indicating that the returning condition for returning to the normal power mode from the sleep mode is satisfied, the power supply portion 140 causes the power supply mode to return from the sleep mode to the normal power mode. Note that, to receive the return signal from the returning condition detecting portion, the power supply portion 140 continues to supply power to the returning condition detecting portion even in the sleep mode.

For example, portions corresponding to the returning condition detecting portion include the operation panel 8. On receiving any operation in the sleep mode, the operation panel 8 transmits a return signal to the power supply portion 140. The communications portion 130 also serves as the returning condition detecting portion. The communications portion 130 transmits a return signal to the power supply portion 140 on receiving image data from the computer 300 in the sleep mode.

Furthermore, although not illustrated, a sensor for detecting that the document conveying unit 1 has been opened/closed, a sensor for detecting that a document D has been set in the document set tray 11, a sensor for detecting attaching/detaching of the sheet cassette 33, etc. also function as a returning condition detection portion. That is, when in the sleep mode, the power supply portion 140 returns the power supply mode from the sleep mode to the normal power mode if the document conveying unit 1 is opened/closed, if a document D is set on the document set tray 11, or if the sheet cassette 33 is attached/detached.

(Hardware Configuration of Image Reading Portion)

Figure 3:
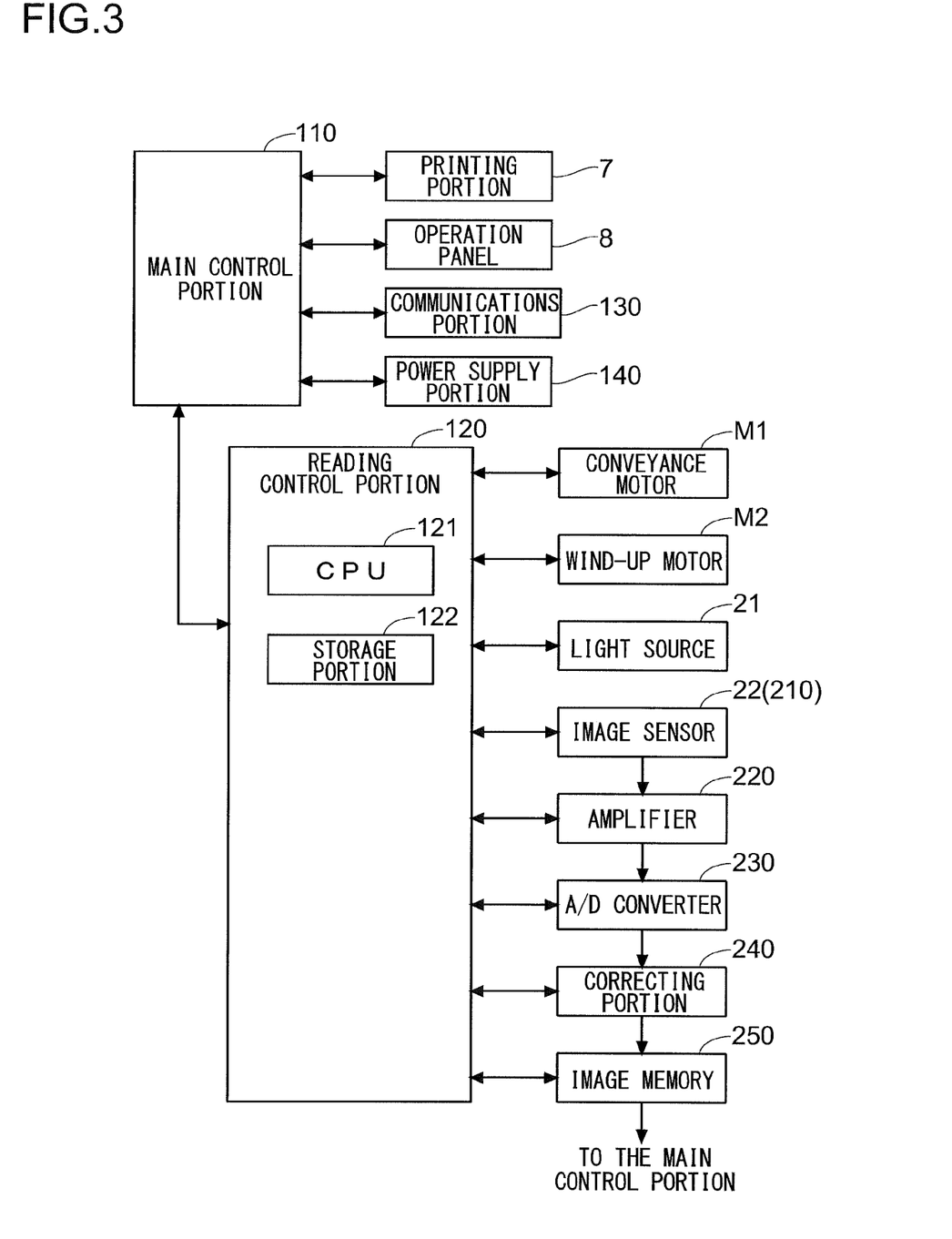
FIG. 3 is a block diagram for illustrating a hardware configuration of an image reading portion of the MFP shown in the FIG. 1.

As shown in FIG. 3, the reading control portion 120 includes a CPU 121 and a storage portion 122. The reading control portion 120 receives instructions from the main control portion 110, and controls the reading operation of the image reading portion 2 and the conveying operation of the document conveying unit 1.

Specifically, the reading control portion 120 is connected to a conveyance motor M1 for rotating the feed roller 13 and the conveying roller pairs 14, and controls the conveyance motor M1 to appropriately rotate the feed roller 13 and the conveying roller pairs 14. The reading control portion 120 is further connected to a wind-up motor M2 for rotating the wind-up drum 26, and the reading control portion 120 appropriately rotates the wind-up drum 26. That is, the reading control portion 120 suitably moves the light source 21 (the movable frame 25) in the sub-scanning direction.

The reading control portion 120 is connected also to the light source 21 and the image sensor 22. The reading control portion 120 controls each operation of the light source 21 and the image sensor 22. For processing analog signals outputted from the image sensor 22, the reading control portion 120 is connected also to an amplifier 220, an A/D converter 230, a correcting portion 240, and an image memory 250. The amplifier 220 amplifies the analog signals outputted from the image sensor 22. The A/D converter 230 converts the analog signals amplified by the amplifier 220 into digital image data. The correcting portion 240 performs correction such as shading correction. The image memory 250 accumulates image data and transmits the image data to the main control portion 110 (the image processing portion 112).

Figure 4:
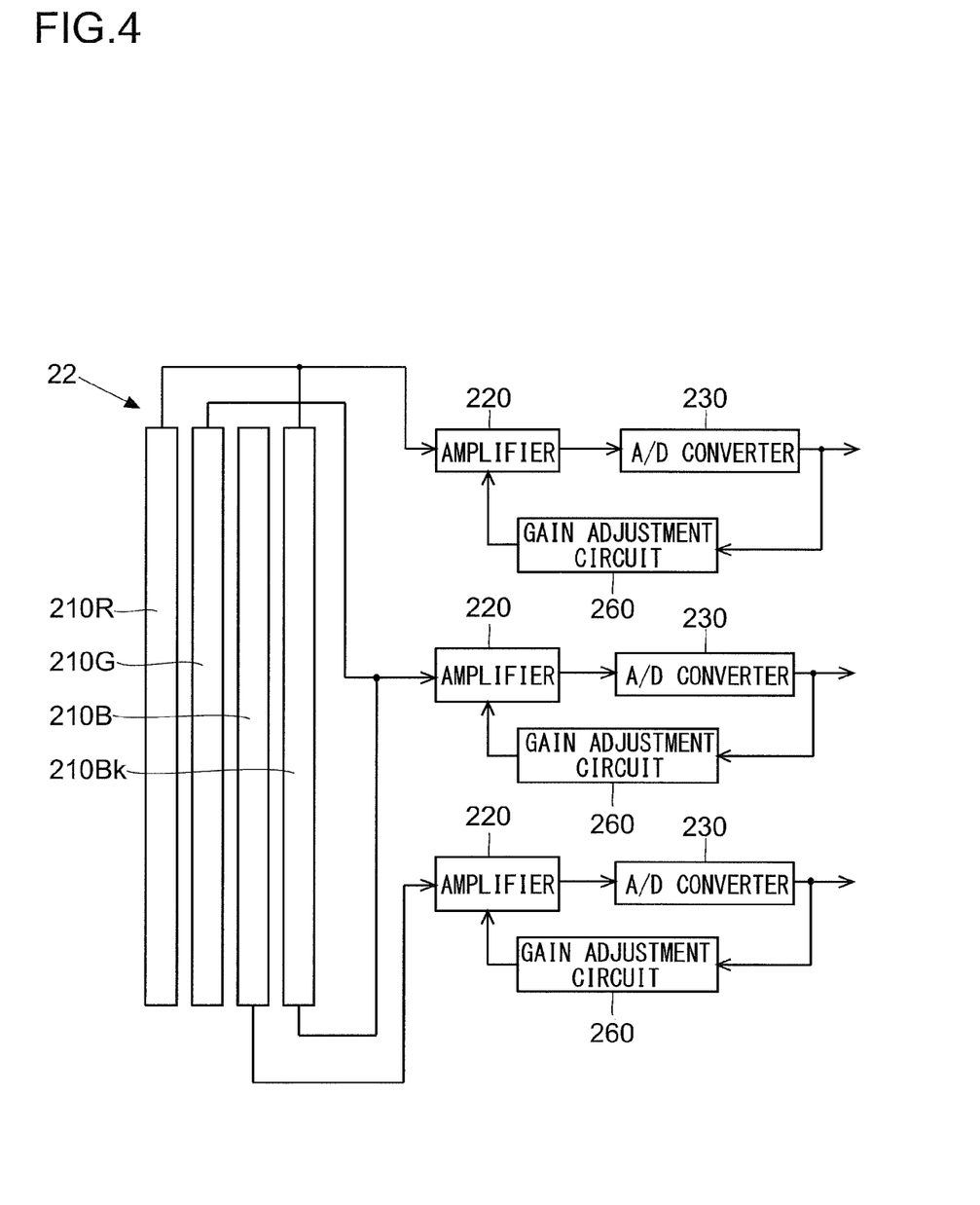
FIG. 4 is a block diagram for illustrating a hardware configuration of the image reading portion of the MFP shown in the FIG. 1.

Here, as shown in FIG. 4, the image sensor 22 includes four line sensors 210R, 210G, 210B, and 210Bk, each having a plurality of linearly aligned photoelectric converting elements. The line sensors 210R, 210G, and 210B are used for reading a document D in the color mode, and output analog signals for generating image data of R (red), G (green), and B (blue), respectively. The line sensor 210Bk is used for reading of a document D in the monochrome mode, and outputs analog signals for generating monochrome (black and white) image data. In the following descriptions, the line sensors 210R, 210G, 210B, and 210Bk may sometimes be referred to simply as line sensor 210.

As the amplifier 220, three amplifiers 220 are actually provided, and they are connected to the line sensors 210R, 210G, and 210B on a one-to-one basis to amplify analog signals received from the corresponding one of the line sensors 210. Likewise, as the A/D converter 230, three A/D converters 230 are actually provided, and they are connected to the amplifiers 220 on the one-to-one basis to convert the analog signals amplified by the corresponding one of the amplifiers 220 into digital image data. That is, analog signals from the line sensors 210R, 210G, and 210B are outputted to separate image data paths, where the amplification processing and the A/D conversion processing are performed on the analog signals.

Analog signals from the line sensor 210Bk are outputted to one of or two or more of the image data paths for the color mode. That is, the monochrome mode shares an image data path or image data paths with the color mode. For example, the line sensor 210Bk is connected to two of the three amplifiers 220, one corresponding to the line sensor 210R, the other corresponding to the line sensor 210G. The line sensor 210Bk outputs analog signals from half of the pixels to one of the two amplifiers 220, and outputs analog signals from the remaining half of the pixels to the other amplifier 220. By sharing the same image data paths for the monochrome mode and the color mode in this way, it is possible to achieve a smaller circuit scale, which consequently leads to cost reduction.

The amplifiers 220 are connected to gain adjustment circuits 260. In a job, the gain adjustment circuits 260 operate to adjust the gain of a corresponding one of the amplifiers 220 to an already set gain. Each of the amplifiers 220 amplifies the received analog signals according to the gain adjusted by corresponding one of the gain adjustment circuits 260.

(Outline of Gain Setting Processing)

The reading control portion 120 obtains gain set values of the amplifiers 220 (hereafter referred to as "gain setting processing") such that analog values amplified by the amplifiers 220 stay within input voltage ranges of the A/D converters 230 and approach upper limit values of the input voltage ranges of the A/D converters 230. When performing the gain setting processing, the reading control portion 120 controls such that reading of the white reference board 28 is performed. That is, the light source 21 illuminates under the contact glass 20b to thereby irradiate the white reference board 28 with light, and the image sensor 22 receives reflected light from the white reference board 28 and outputs analog signals. The amplifiers 220 amplify the analog signals outputted from the image sensor 22, and the A/D converters 230 perform A/D conversion on the analog signals amplified by the amplifiers 220. At this time, the gain adjustment circuits 260, for example, set the gains of the amplifiers 220 to predetermined values (for example, "1"). Then, the gain adjustment circuits 260 obtain output values of the A/D converters 230, and, based on differences between the output values of the A/D converters 230 and target values, the gain adjustment circuits 260 set the gains of the amplifiers 220 such that the output values of the A/D converters 230 reach the target values.

Here, as shown in FIG. 4, two of the amplifiers 220, one of which is connected to the line sensor 210R and the other of which is connected to the line sensor 210G, are connected also to the line sensor 210Bk, so as to be used in both the color mode and the monochrome mode. With this configuration, the two amplifiers 220 connected to the line sensor 210R and 210G are each equivalent to a "shared amplifier". Here, the number of the amplifiers 220 to be used in both the color mode and the monochrome mode is not limited to a particular number; a plurality of the amplifiers 220 may be shared or just one of the amplifiers 220 may be shared. Where an amplifier 220 exists that is shared for the two modes in this way, with respect to the amplifier 220 shared in the two modes, it is necessary to individually set a gain for the color mode and a gain for the monochrome mode. This is because the line sensors 210 for the color mode and for the monochrome mode are different from each other in sensitivity, which results in different optimum gain set values.

Thus, the reading control portion 120 first obtains a one-mode gain set value which is used for an amplifier 220 in one mode of the color mode and the monochrome mode. Thereafter, the reading control portion 120 obtains an other-mode gain set value which is used for an amplifier 220 in the other mode of the color mode and the monochrome mode.

(Timing for Starting Gain Setting Processing)

The reading control portion 120 starts the gain setting processing at a starting time point which is previously determined as a time point to start the gain setting processing. For example, the reading control portion 120 starts the gain setting processing when the main power supply is started to be supplied to the MFP 100, or on returning of the MFP 100 from the sleep mode to the normal power mode.

At the starting time point, the reading control portion 120 also sets one of the color mode and the monochrome mode as a priority mode. Then the reading control portion 120 starts processing of obtaining a priority mode gain set value which is used for an amplifier 220 in the priority mode (hereafter referred to as "priority mode gain setting processing"). After the priority mode gain setting processing is completed, the reading control portion 120 performs processing of obtaining a non-priority mode gain set value which is used for an amplifier 220 in a non-priority mode, which is one of the color mode and the monochrome mode that is not set as the priority mode (hereafter referred to as "non-priority mode gain setting processing"). Here, the procedure may be as follows, that is: without setting the priority mode, the reading control portion 120 starts with processing of obtaining a one-mode gain set value which is used for an amplifier 220 in a previously determined one mode of the color mode and the monochrome mode, and after the first started processing is completed, the reading control portion 120 starts processing of obtaining an other-mode gain set value of an amplifier 220, which is used for an amplifier 220 in the other mode of the color mode and the monochrome mode.

Now, back to the operation panel 8, it receives an instruction to perform a reading job even while the non-priority mode gain setting processing is being performed. In a case where the operation panel 8 receives an instruction to perform a reading job in the priority mode while the non-priority mode gain setting processing is being performed, at the time point when the instruction to perform a reading job in the priority mode is received, the non-priority mode gain setting processing has not been completed yet but the priority-mode gain setting processing is completed. That is, it is possible to suitably adjust the priority-mode gain which is used for an amplifier 220 in the priority mode.

Figure 5:
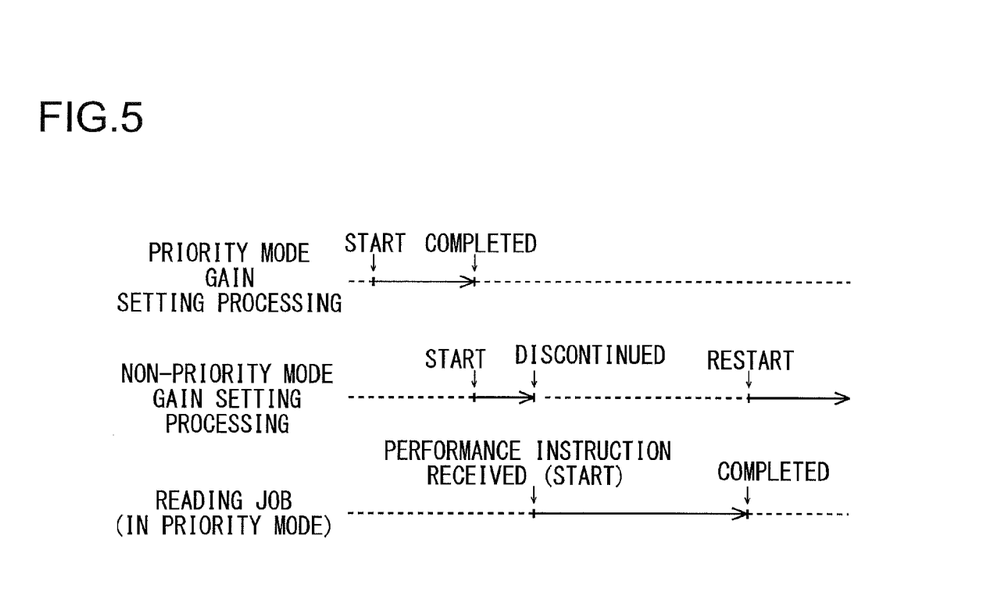
FIG. 5 is a diagram for illustrating timing for starting gain setting processing performed in the MFP shown in FIG. 1.

Thus, in the case where the operation panel 8 receives an instruction to perform a reading job in the priority mode while the non-priority mode gain setting processing is being performed, the reading control portion 120 discontinues the non-priority mode gain setting processing that is currently performing, and performs the reading job in the priority mode instead as shown in FIG. 5. Then, after the reading job in the priority mode is completed, the reading control portion 120 restarts the discontinued non-priority mode gain setting processing from the beginning.

Figure 6:
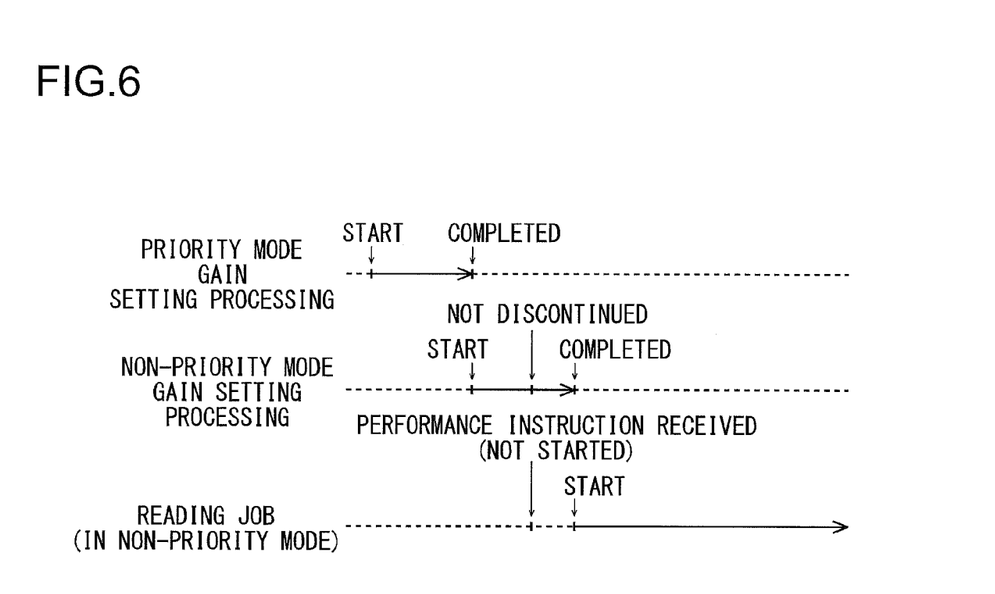
FIG. 6 is a diagram for illustrating timing for starting gain setting processing performed in the MFP shown in FIG. 1.

There is also a case where the operation panel 8 receives an instruction to perform a reading job in the non-priority mode while the non-priority mode gain setting processing is being performed. In this case, as shown in FIG. 6, the reading control portion 120 completes the non-priority mode gain setting processing without discontinuing it. Then, after completing the non-priority mode gain setting processing, the reading control portion 120 performs the reading job in the non-priority mode.

(Setting of Priority Mode)

For determining which of the color mode and the monochrome mode to be set as the priority mode, the reading control portion 120 causes the storage portion 122 to store a number of times of reading in the color mode and a number of times of reading in the monochrome mode.

If a total number of times of reading is smaller than a predetermined number of times at a starting time point to start the gain setting processing, the reading control portion 120 sets, as the priority mode, one of the color mode and the monochrome mode previously set as a default mode. The default mode is a mode with respect to which the gain setting processing is determined to be performed first. In other words, the reading control portion 120 sets the default mode as the priority mode until the total number of times of reading exceeds the predetermined number of times. Since the MFP 100 is a monochrome machine, the monochrome mode is the default mode. Of course, the color mode may be set as the default mode, however.

On the other hand, if the total number of times of reading is equal to or greater than the predetermined number of times at the starting time point, the reading control portion 120 obtains a degree of imbalance between the number of times of reading in the color mode and the number of times of reading in the monochrome mode, and determines whether or not the degree of imbalance satisfies a predetermined condition. In a case where the predetermined condition is satisfied, the reading control portion 120 sets, as the priority mode, one of the color mode and the monochrome mode in which reading has been performed a greater number of times than in the other mode of the color mode and the monochrome mode. On the other hand, in a case where the predetermined condition is not satisfied, the reading control portion 120 sets the default mode as the priority mode.

For example, if the total number of times of reading is equal to or greater than the predetermined number of times at the starting time point, the reading control portion 120 obtains, as a value indicating the degree of imbalance, a ratio of the number of times of reading performed in one of the color mode and the monochrome mode in which reading has been performed a greater number of times than in the other mode to the total number of times of reading performed. Then, if the obtained ratio is equal to or greater than a previously determined threshold value, the reading control portion 120 determines that the predetermined condition is satisfied, and sets, as the priority mode, one of the color mode and the monochrome mode in which reading has been done a greater number of times than in the other mode. On the other hand, if the obtained ratio is smaller than the threshold value, the reading control portion 120 determines that the predetermined condition is not satisfied, and sets the default mode as the priority mode.

A description will be given below, taking, as a specific example, a case where the predetermined number of times is 1000 times and the threshold value is 70%.

In this example, if the number of times of reading in the color mode is 300 times, and the number of times of reading in the monochrome mode is 700 times, the total number of times of reading is 1000 times, and thus the predetermined number of times has been reached. Thus, the reading control portion 120 obtains the ratio as the degree of imbalance. Here, 700 times is the number of times of reading performed in one mode of the color mode and the monochrome mode in which reading has been performed a greater number of times than in the other mode, and 1000 times is the total number of times of reading, and thus, the ratio obtained by the reading control portion 120 is 70%. That is, the ratio obtained by the reading control portion 120 is equal to or greater than the threshold value. Consequently, the reading control portion 120 determines that the predetermined condition is satisfied. Then, since reading has been performed a greater number of times in the monochrome mode, the reading control portion 120 sets the monochrome mode as the priority mode.

Here, if the number of times of reading in the color mode is 700 times and the number of times of reading in the monochrome mode is 300 times, since reading has been performed a greater number of times in the color mode, the color mode is set as the priority mode. If the number of times of reading in the color mode is 400 times, and the number of times of reading in the monochrome mode is 600 times, the ratio obtained by the reading control portion 120 is 60%, and is smaller than the threshold value, and thus, the monochrome mode, which is the default mode, is set as the priority mode.

(Flow of Control of Gain Setting Processing)

Figure 7:
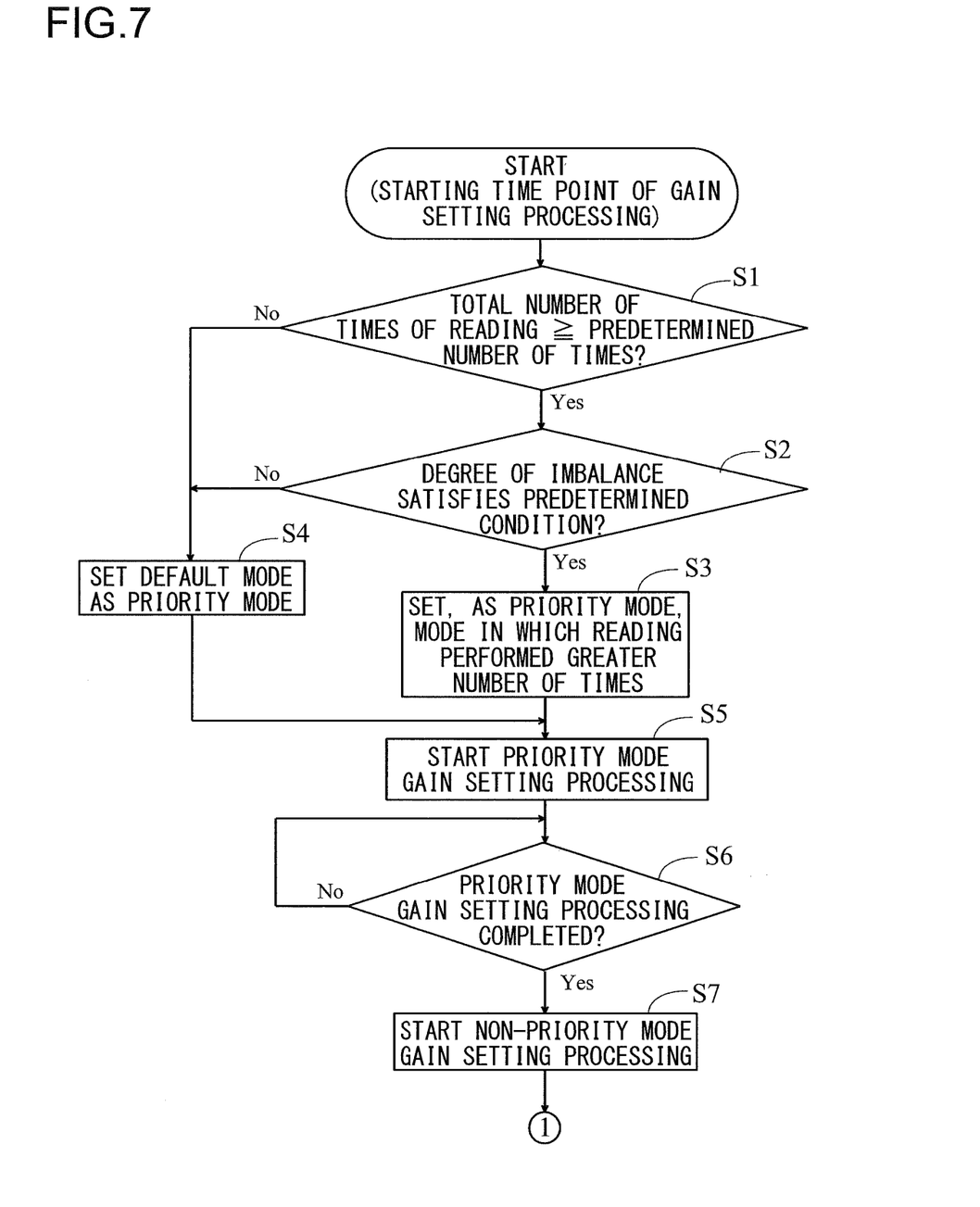
FIG. 7 is a flow chart for illustrating a control flow of the gain setting processing performed in the MFP shown in FIG. 1.
Figure 8:
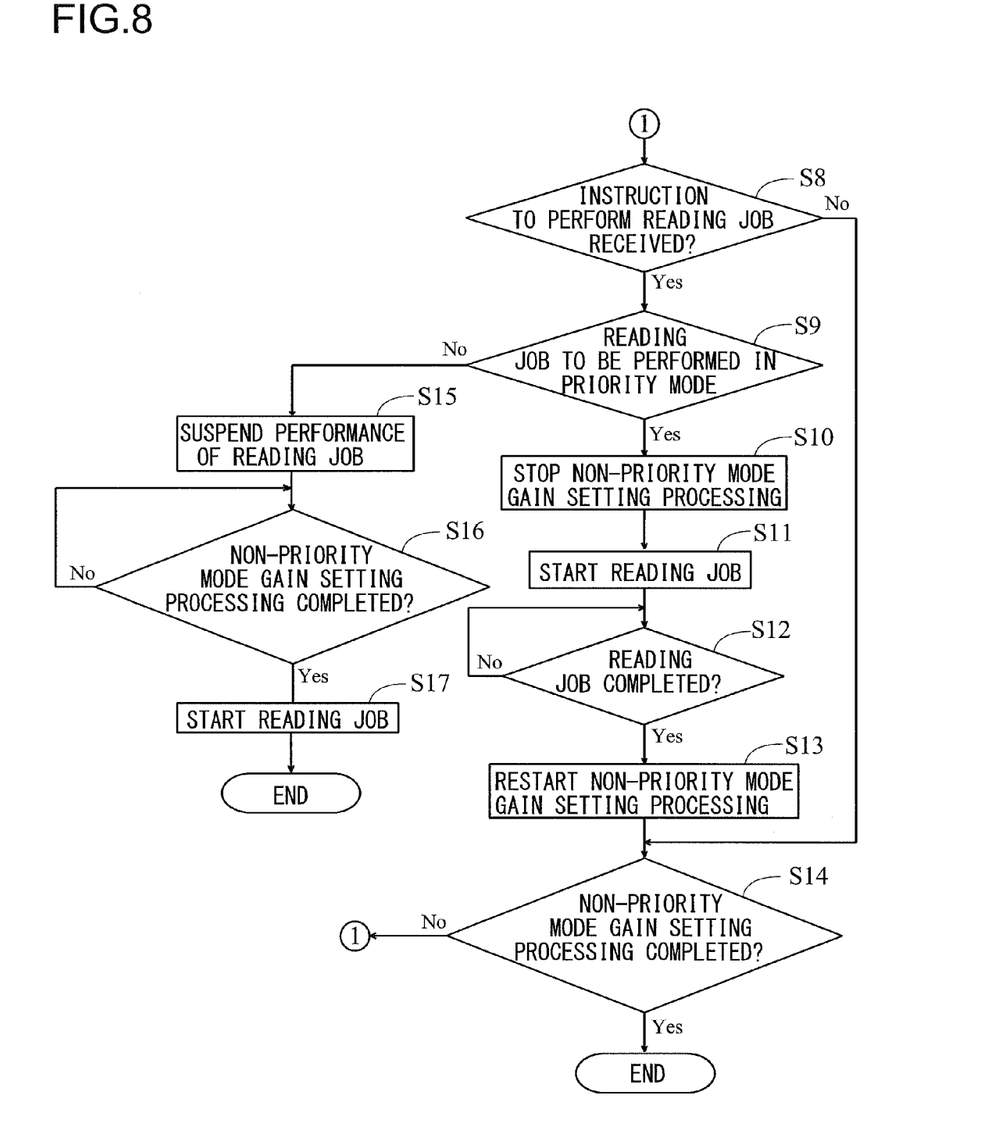
FIG. 8 is a flow chart for illustrating a control flow of the gain setting processing performed in the MFP shown in FIG. 1.

With reference to FIGS. 7 and 8, descriptions will be given below of a flow of control of the gain setting processing. Note that, in FIGS. 7 and 8, the flow starts at a starting time point when the gain setting processing should be started (that is, at a time of the main power supply starting to be supplied to the MFP 100, or at a time of the MFP 100 returning to the normal power mode from the sleep mode).

In Step S1, the reading control portion 120 determines whether the total number of times of reading is equal to or greater than the predetermined number of times. If it is determined that the total number of times of reading is equal to or greater than the predetermined number of times, the flow proceeds to Step S2.

In Step S2, the reading control portion 120 obtains a value indicating the degree of imbalance, that is, a ratio of the number of times of reading performed in one mode of the color mode and the monochrome mode in which reading has been performed a greater number of times than in the other mode to the total number of times of reading, and determines whether or not the degree of imbalance satisfies the predetermined condition (that is, whether or not the ratio as a value indicating the degree of imbalance is equal to or greater than the threshold value). The flow proceeds to Step S3 if it is determined that the degree of imbalance satisfies the predetermined condition. In Step S3, the reading control portion 120 sets one of the color mode and the monochrome mode in which reading has been performed the greater number of times than in the other mode as the priority mode.

On the other hand, if it is determined in Step S2 that the degree of imbalance does not satisfy the predetermined condition, the flow proceeds to Step S4. Also, note that, if it is determined in Step S1 that the total number of times of reading is smaller than the predetermined number of times, the flow proceeds to Step S4. In Step S4, the reading control portion 120 sets whichever of the color mode and the monochrome mode is the default mode as the priority mode.

After the setting of the priority mode, the flow proceeds to Step S5, where the reading control portion 120 starts the priority-mode gain setting processing (processing of obtaining a priority-mode gain set value which is used for an amplifier 220 in the priority mode). Thereafter, in Step S6, the reading control portion 120 determines whether or not the priority mode gain setting processing is completed. If it is determined that the priority mode gain setting processing is completed, the flow proceeds to Step S7. Here, if it is determined that the priority mode gain setting processing is not completed, the reading control portion 120 repeats the determination in Step S6.

In Step S7, the reading control portion 120 starts the non-priority mode gain setting processing (processing of obtaining a non-priority-mode gain set value which is used in the non-priority mode for an amplifier 220). Thereafter, in Step S8, the reading control portion 120 determines whether or not there has been received an instruction to perform a reading job. If it is determined that there has been received an instruction to perform a reading job, the flow proceeds to Step S9.

In Step S9, the reading control portion 120 determines whether or not the mode of the reading job to be performed is the priority mode. The flow proceeds to Step S10 if it is determined that the mode of the reading job to be performed is the priority mode. In Step S10, the reading control portion 120 discontinues the non-priority mode gain setting processing that is currently performing. Then, in Step S11, the reading control portion 120 starts the reading job in the priority mode.

Thereafter, in Step S12, the reading control portion 120 determines whether or not the reading job is completed. If it is determined that the reading job is completed, the flow proceeds to Step S13, and if it is determined that the reading job is not completed, the reading control portion 120 repeats the determination in Step S12. In Step S13, the reading control portion 120 restarts the discontinued non-priority mode gain setting processing.

When the non-priority mode gain setting processing is restarted, the flow proceeds to Step S14. Note that, if it is determined in Step S8 that there has been received no instruction to perform a reading job, too, the flow proceeds to Step S14. Then, in step S14, the reading control portion 120 determines whether or not the non-priority mode gain setting processing is completed. If it is determined that the non-priority mode gain setting processing is completed, the reading control portion 120 finishes the present control, and if it is determined that the non-priority mode gain setting processing is not completed, the flow returns to Step S8.

Also, back to Step S9, if, in Step S9, it is determined that the mode of the reading job to be performed is not the priority mode (that is, if the mode is the non-priority mode), the flow proceeds to Step S15. In Step S15, the reading control portion 120 suspends performance of the reading job in the non-priority mode, and continues the non-priority mode gain setting processing without discontinuing it. Then, in Step S16, the reading control portion 120 determines whether or not the non-priority mode gain setting processing is completed. If it is determined that the non-priority mode gain setting processing is completed, the flow proceeds to Step S17, and if it is determined that the non-priority mode gain setting process is not completed, the reading control portion 120 repeats the determination in step S16. In Step S17, the reading control portion 120 starts performing the reading job in the non-priority mode (the reading job performance which has been suspended).

The MFP 100 (image reading device and image forming apparatus) of the present embodiment includes, as described above, the light source 21 that irradiates a reading target with light, the image sensor 22 including a plurality of line sensors 210, the plurality of amplifiers 220 that amplify analog signals outputted from the image sensor 22, the plurality of gain adjustment circuits 260 that are provided corresponding to the plurality of amplifiers 220 on the one-to-one basis, and each perform gain adjustment of the corresponding one of the amplifiers 220, the plurality of A/D converter 230 that are provided corresponding to the plurality of amplifiers 220 on the one-to-one basis, and each convert analog signals amplified by the corresponding one of the amplifiers 220 into digital image data, the reading control portion 120 that causes each of the plurality of gain adjustment circuits 260 to perform gain adjustment of the corresponding one of the plurality of amplifiers 220, and the operation panel 8 (the reception portion) that receives an instruction to perform a reading job and also receives a selection of one of the color mode and the monochrome mode as the mode in performing the reading job. Furthermore, at least one of the plurality of amplifiers 220 (two of the amplifiers 220 one connected to the line sensor 210R, the other connected to the line sensor 210G) is a shared amplifier 220 that is used in both the color mode and the monochrome mode. At the starting time point, which is previously determined as a time point to start the gain setting processing for obtaining gain set values of the amplifiers 220, the reading control portion 120 sets the color mode or the monochrome mode as the priority mode (one mode), starts the priority mode gain setting processing (one mode gain setting processing), which is processing of obtaining a priority-mode gain set value, which is used in the priority mode for an amplifier 220, and after the priority mode gain setting processing is completed, performs the non-priority mode gain setting processing (other mode gain setting processing), which is processing of obtaining a non-priority-mode gain set value, which is used for an amplifier 220 in the non-priority mode (the other mode) which is one of the color mode and the monochrome mode that is not the priority mode. Moreover, in a case where the operation panel receives an instruction to perform a reading job in the priority mode while the non-priority mode gain setting processing is being performed, the reading control portion 120 discontinues the non-priority mode gain setting processing, and performs the reading job in the priority mode.

According to the configuration of the present embodiment, in the case where an instruction to perform a reading job in the priority mode is received while the non-priority mode gain setting processing is being performed, the non-priority mode gain setting processing is discontinued and the reading job in the priority mode is performed. With this configuration, it is possible to reduce a waiting time for a user who desires a reading job to be performed in the priority mode, and this helps achieve improved user-friendliness. What is more, when an instruction to perform a reading job in the priority mode is received while the non-priority mode gain setting processing is being performed, the non-priority mode gain setting processing is discontinued to thereby reduce the waiting time for the user, and thus, there is no need of adopting a method of reducing the waiting time for the user by obtaining a non-priority mode gain set value through calculation based on a priority mode gain set value. Thereby, it is possible to alleviate degradation of the image quality of an image read in the non-priority mode.

Furthermore, as described above, the present embodiment includes the storage portion 122 that stores the number of times of reading performed in the color mode and the number of times of reading performed in the monochrome mode. And, at the starting time point, the reading control portion 120 obtains the degree of imbalance between the numbers of times of reading in the color mode and the monochrome mode, and if the degree of imbalance satisfies the predetermined condition, one of the color mode and the monochrome mode in which reading has been performed a greater number of times than in the other mode is set as the priority mode, and if the degree of imbalance does not satisfy the predetermined condition, one of the color mode and the monochrome mode that is set as the default mode (a mode that is previously determined as a mode with respect to which the gain setting processing should be performed first) is set as the priority mode. Here, one mode in which reading has been performed a greater number of times than in the other mode is a mode of higher usage frequency. Thus, in cases where the degree of imbalance between the numbers of times of reading performed in the color mode and in the monochrome mode satisfies the predetermined condition, it means that a state is obtained where a reading job in the mode of the higher usage frequency can be performed quickly, and this helps achieve improved user friendliness.

Furthermore, according to the present embodiment, as described above, at the starting time point, the reading control portion 120 obtains a ratio of the number of times of reading performed in one mode of the color mode and the monochrome mode in which reading has been performed a greater number of times than in the other mode to the total number of times of reading, and if the obtained ratio is equal to or greater than the previously determined threshold value, the reading control portion 120 determines that the predetermined condition is satisfied, and sets, as the priority mode, the mode in which reading has been performed a greater number of times than in the other mode, while, if the obtained ratio is smaller than the threshold value, the reading control portion 120 determines that the predetermined condition is not satisfied, and sets the default mode as the priority mode. Thereby, it is possible to easily set a mode of higher usage frequency as the priority mode.

Furthermore, according to the present embodiment, as described above, the reading control portion 120 sets the default mode as the priority mode until the total number of times of reading exceeds the predetermined number of times. In other words, the reading control portion 120 performs setting of the priority mode based on the degree of imbalance after the total number of reading exceeds the predetermined number of times. Thereby, it is possible to correctly determine which mode has been used more frequently.

Furthermore, according to the present embodiment, as described above, in the case where the non-priority mode gain setting processing is discontinued, the reading control portion 120 restarts the non-priority mode gain setting processing from the beginning after a reading job in the priority mode is completed. Thereby, it is possible to quickly obtain the non-priority-mode gain set value, which is used in the non-priority mode for an amplifier 220, after the reading job in the priority mode is completed. That is, it is possible to obtain a state where a reading job in the non-priority mode can be quickly performed.

Moreover, according to the present embodiment, as described above, in the case where the operation panel 8 receives an instruction to perform a reading job in the non-priority mode while the non-priority mode gain setting processing is being performed, the reading control portion 120 performs the reading job in the non-priority mode after completing the non-priority mode gain setting processing. Thereby, in performing a reading job in the non-priority mode, it is possible to adjust the gain set value of an amplifier 220 that is used in the non-priority mode to a value suitable for a current state of the device.

It should be understood that the embodiments disclosed herein are merely illustrative in all respects, and should not be interpreted restrictively. The range of the present disclosure is shown not by the above descriptions of embodiments but the scope of claims for patent, and it is intended that all modifications within the meaning and range equivalent to the scope of claims for patent are included.

What is claimed is:

1. An image reading device equipped with a color mode in which color image data is generated and a monochrome mode in which monochrome image data is generated, the image reading device comprising:
 a light source configured to irradiate a reading target with light;
 an image sensor;
 a plurality of amplifiers configured to amplify an analog signal outputted from the image sensor;
 a plurality of gain adjustment circuits provided corresponding to the plurality of amplifiers on a one-to-one basis, each being configured to perform gain adjustment of a corresponding one of the plurality of amplifiers;
 a plurality of A/D converters provided corresponding to the plurality of amplifiers on the one-to-one basis, each being configured to convert an analog signal amplified by a corresponding one of the plurality of amplifiers into digital image data;
 a reading control portion configured to cause gain adjustment of each of the plurality of amplifiers to be performed by a corresponding one of the plurality of gain adjustment circuits; and
 a reception portion configured to receive both an instruction to perform a reading job and a selection of one of the color mode and the monochrome mode as a mode in performing the reading job,
 wherein
 the image sensor includes a line sensor for the color mode used in generating image data in the color mode, and in addition to the line sensor for the color mode, the image sensor also includes a line sensor for the monochrome mode used in generating image data in the monochrome mode;
  at least one of the plurality of amplifiers is a shared amplifier used in both the color mode and the monochrome mode;
  the shared amplifier is used in common by the line sensor for the color mode and the line sensor for the monochrome mode;
  at a starting time point previously determined as a time point to start gain setting processing for obtaining gain set values of the amplifiers, the reading control portion starts one-mode gain setting processing for obtaining a gain set value of the shared amplifier in one of the color mode and the monochrome mode, and after completion of the one-mode gain setting processing, the reading control portion performs other-mode gain setting processing for obtaining a gain set value of the shared amplifier in an other of the color mode and the monochrome mode; and
  in a case where the reception portion receives an instruction to perform a reading job in the one mode, while the other-mode gain setting processing is being performed, the reading control portion discontinues the other-mode gain setting processing, and performs the reading job in the one mode,
 the reading control portion previously sets one of the color mode and the monochrome mode as a priority mode, and at the starting time point, the reading control portion starts with processing of obtaining a priority-mode gain set value, which is used for an amplifier in the priority mode,
  a storage portion is provided which is configured to store a number of times of reading performed in the color mode and a number of times of reading performed in the monochrome mode, and
 at the starting time point, the reading control portion obtains a degree of imbalance between the number of times of reading performed in the color mode and the number of times of reading performed in the monochrome mode, and if the degree of imbalance satisfies a predetermined condition, the reading control portion sets, as the priority mode, one of the color mode and the monochrome mode in which reading has been performed a greater number of times than in the other mode, and if the degree of imbalance does not satisfy the predetermined condition, the reading control portion sets, as the priority mode, one of the color mode and the monochrome mode that is previously determined as a mode for which the gain setting processing should be performed first.

2. The image reading device according to claim 1, wherein
at the starting time point, the reading control portion obtains a ratio, to a total number of times of reading, of a number of times of reading in one of the color mode and the monochrome mode in which reading has been performed a greater number of times than in the other mode, and if the ratio is equal to or greater than a previously determined threshold value, the reading control portion determines that the predetermined condition is satisfied, and sets, as the priority mode, the one of the color mode and the monochrome mode in which reading has been performed a greater number of times than in the other mode, whereas if the ratio is smaller than the threshold value, the reading control portion determines that the predetermined condition is not satisfied, and sets the previously determined mode as the priority mode.

3. The image reading device according to claim 2, wherein
the reading control portion sets the previously determined mode as the priority mode until the total number of times of reading exceeds a predetermined number of times.

4. The image reading device according to claim 1, wherein
in a case where the other-mode gain setting processing is discontinued,
the reading control portion restarts the other-mode gain setting processing from a beginning after the reading job in the one mode is completed.

5. The image reading device according to claim 1, wherein
in a case where the reception portion receives an instruction to perform a reading job in the other mode while the other-mode gain setting processing is being performed, the reading control portion suspends performance of the reading job in the other mode which the reception portion has received the instruction to perform, and the reading control portion continues the other-mode gain setting processing.

6. The image reading device according to claim 5, wherein when the other-mode gain setting processing is completed, the reading control portion starts the reading job in the other mode performance of which has been suspended.

7. An image forming apparatus comprising the image reading device according to claim 1.

* * * * *